United States Patent
He et al.

(10) Patent No.: US 9,692,547 B2
(45) Date of Patent: Jun. 27, 2017

(54) OPTICAL WAVELENGTH AUTOMATIC ADAPTATION OF TRANSCEIVERS

(71) Applicant: FINISAR CORPORATION, Sunnyvale, CA (US)

(72) Inventors: Mingshou He, Shanghai (CN); Huade Shu, Shanghai (CN); Jing Li, Shanghai (CN); Bin Ma, Shanghai (CN); Ronghua Jin, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 24 days.

(21) Appl. No.: 14/958,392

(22) Filed: Dec. 3, 2015

(65) Prior Publication Data

US 2017/0155464 A1    Jun. 1, 2017

(30) Foreign Application Priority Data

Nov. 27, 2015  (CN) .......................... 2015 1 0848125

(51) Int. Cl.
*H04J 14/02*      (2006.01)
(52) U.S. Cl.
CPC ...... *H04J 14/0256* (2013.01); *H04J 14/0295* (2013.01)

(58) Field of Classification Search
CPC .................................. H04J 14/0241–14/0252
See application file for complete search history.

(56) References Cited

U.S. PATENT DOCUMENTS

| 2012/0224850 A1* | 9/2012 | Cavaliere | ............... | H04J 14/00 398/34 |
| 2015/0131994 A1* | 5/2015 | Stracca | ............... | H04J 14/0246 398/58 |

* cited by examiner

*Primary Examiner* — Shi K Li
(74) *Attorney, Agent, or Firm* — Maschoff Brennan

(57) ABSTRACT

In some aspects, an example method may include receiving, at a receiver of a first optoelectronic module, a loss of signal indicator from a second optoelectronic module that is remote from the first optoelectronic module. The method may include iteratively cycling through transmission of optical signals on a plurality of wavelength channels to the second optoelectronic module until the loss of signal indicator terminates in response to receiving the loss of signal indicator. The method may include continuing to transmit the optical signal on a particular one of the plurality of wavelength channels in response to the loss of signal indicator terminating while transmitting an optical signal on the particular one of the plurality of wavelength channels.

20 Claims, 4 Drawing Sheets

| | TX 112 | RX 114 | LOS 152 | | TX 132 | RX 134 | LOS 154 |
|---|---|---|---|---|---|---|---|
| 1 | off | off | on | | off | off | on |
| 2 | on | off | on | ⟶ | off | on | off |
| 3 | on | off | on | ◀ − − − − − λ1 | on | on | off |
| 4 | on | off | on | ◀ − − − − − λ2 | on | on | off |
| 5 | on | on | off | ⟵ λ3 | on | on | off |
| 6 | on | on | off | ⟶ | on | on | off |

OPTICAL WAVELENGTH AUTOMATIC ADAPTATION OF TRANSCEIVERS

CROSS-REFERENCE TO RELATED APPLICATIONS

This application claims priority to Chinese Patent Application No. 201510848125.4, filed Nov. 27, 2015, entitled OPTICAL WAVELENGTH AUTOMATIC ADAPTATION OF TRANSCEIVERS, which is incorporated by reference in its entirety.

FIELD

The present disclosure generally relates to signal transmission using optoelectronic devices.

BACKGROUND

In some circumstances, optoelectronic devices may be used in multiplexed networks to transmit signals or data. Multiplexing is a technique that enables multiple signals to be transmitted on the same transmission medium at the same time. Wavelength division multiplexing ("WDM") enables multiple optical signals to be transmitted over the same optical fiber. This is accomplished by having each signal have a different wavelength. On the transmission side, the various signals with different wavelengths are injected into the same optical fiber. At the receiving end of the transmission, the wavelengths are often separated. The advantage of WDM systems is that it effectively provides virtual fibers by making a single optical fiber carry multiple optical signals with different carrier wavelengths.

A dense wavelength division multiplexing ("DWDM") system may use carrier wavelengths where the separation between carrier wavelengths is less than a nanometer. In a DWDM system, more carrier wavelengths can be used to increase the capacity of the DWDM system. The wavelengths emitted by optoelectronic modules may be adjusted as needed based on the emitted wavelength and a target wavelength. The ability to adjust wavelengths may be useful in optical systems and in particular in WDM and DWDM systems.

The subject matter claimed herein is not limited to implementations that solve any disadvantages or that operate only in environments such as those described above. Rather, this background is only provided to illustrate one example technology area where some implementations described herein may be practiced.

SUMMARY

The present disclosure generally relates to signal transmission using optoelectronic devices.

In some aspects, an example method may include receiving, at a receiver of a first optoelectronic module, a loss of signal indicator from a second optoelectronic module that is remote from the first optoelectronic module. The method may include iteratively cycling through transmission of optical signals on a plurality of wavelength channels to the second optoelectronic module until the loss of signal indicator terminates in response to receiving the loss of signal indicator. The method may include continuing to transmit the optical signal on a particular one of the plurality of wavelength channels in response to the loss of signal indicator terminating while transmitting an optical signal on the particular one of the plurality of wavelength channels.

In some aspects, an example method may include receiving, at a receiver of a first optoelectronic module, a loss of signal indicator from a second optoelectronic module that is remote from the first optoelectronic module. The method may include, in response to receiving the loss of signal indicator, transmitting, by a transmitter of the first optoelectronic module, an optical signal on a first wavelength channel towards the second optoelectronic module. The method may include, in response to the loss of signal indicator persisting, tuning the transmitter to transmit an optical signal on a second wavelength channel. The method may include, in response to the loss of signal indicator terminating, continuing to transmit the optical signal on the first wavelength channel.

An example optoelectronic module may include a first receiver configured to receive a loss of signal indicator from a second optoelectronic module. The optoelectronic module may include a first transmitter configured to transmit an optical signal on a first wavelength channel towards the second optoelectronic module in response to the first receiver receiving the loss of signal indicator from the second optoelectronic module. The optoelectronic module may include a wavelength tuner configured to tune the first transmitter to transmit an optical signal on a second wavelength channel in response to the loss of signal indicator persisting or to maintain the first transmitter transmitting the optical signal on the first wavelength channel in response to the loss of signal indicator terminating.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description that follows, and in part will be obvious from the description, or may be learned by practice. The features and advantages may be realized and obtained by means of the instruments and combinations particularly pointed out in the appended claims. These and other features will become more fully apparent from the following description and appended claims.

BRIEF DESCRIPTION OF THE DRAWINGS

Example embodiments will be described and explained with additional specificity and detail through the use of the accompanying drawings in which.

DETAILED DESCRIPTION

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to signal transmission using optoelectronic modules. As used herein, the term "optoelectronic modules" includes modules having optical and electrical components. Examples of optoelectronic modules include, but are not limited to transponders, transceivers, transmitters, and/or receivers.

In some circumstances, data transmitted over a network may include double modulated signals that include both modulated high-speed data and out-of-band data. The double modulated signal is transmitted on a physical link such as an optical fiber between optoelectronic modules and/or other components in a network of connected components/hosts. High-speed data refers to data typically transmitted on a network such as the data typically transmitted for the benefit of the various hosts on a network. High-speed data may also be referred to as in-band data which refers to the communication band typically used by host systems to communicate data. High-speed and in-band data are distinguished from out-of-band data which is typically used to transmit data between optoelectronic modules for the optoelectronic modules to use in operation. The terms "high-speed data" and "out-of-band data," as used in this disclosure, does not refer to any particular defined bandwidth or frequency of data. However, in some circumstances, out-of-band data may be transmitted on a wavelength channel unused by in-band data and/or at a slower frequency than in-band data.

Out-of-band data can be modulated onto a signal carrying high-speed data that is ordinarily transmitted on a physical link such as an optical fiber, thus creating a double modulated signal on the physical link. This allows for the independent transmission of authentication and/or encryption information between modules. Out-of-band data may be transmitted across a network switch. While a host may subsequently receive the out-of-band data, the host usually receives the out-of-band data from an optoelectronic module or transceiver through a bus such as an I²C or MDIO bus. This is contrasted to high-speed data which is typically received by a host from an optoelectronic module or transceiver through some high-speed data interface. A host may also produce the out-of-band data and transmit the out-of-band data to an optoelectronic module or transceiver on a different bus or different data lines than high-speed data.

Figures 1A, 1B:
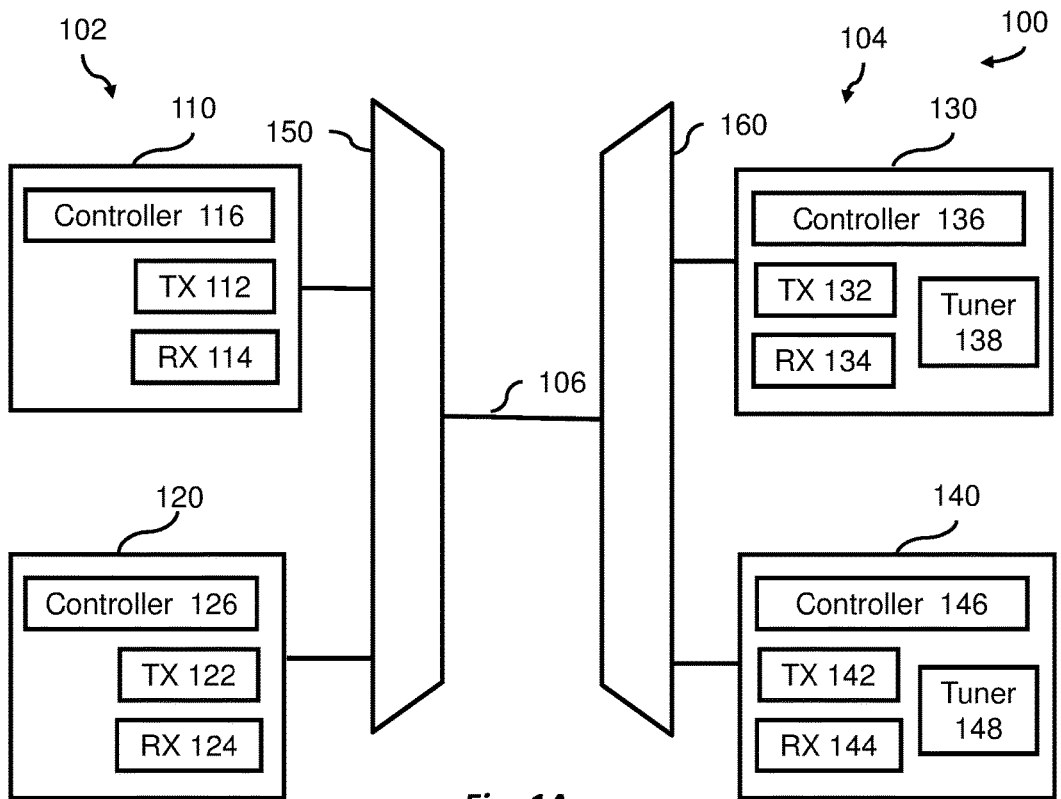
FIG. 1A is a schematic representation of an example network.
FIG. 1B is a representation of signals exchanged in the network of FIG. 1A.

FIG. 1A illustrates an example of a network 100 that implements aspects of the disclosure. The network 100 is illustrative and other network configurations within the scope of this disclosure may be implemented. As illustrated, the network 100 includes various optoelectronic modules such as optoelectronic modules 110, 120, 130, 140. Each of the optoelectronic modules 110, 120, 130, and 140 may include corresponding transmitters 112, 122, 132, 142; receivers 114, 124, 134, and 144; and controllers 116, 126, 136, 146. In some configurations, the transmitters 112, 122, 132, 142 may be transmitter arrays and/or the receivers 114, 124, 134, and 144 may be receiver arrays.

The optoelectronic modules 110, 120 may be positioned on a first side 102 of the network 100 and the optoelectronic modules 130, 140 may be positioned on a second side 104 of the network 100. The optoelectronic modules 110, 120 on the first side 102 may be configured to exchange optical signals with the optoelectronic modules 130, 140 on the second side 104 over an optical fiber 106. In some circumstances, the first side 102 may be considered a local side and the second side 104 may be considered a remote side, or vice versa.

In some configurations, the network 100 FIG. 1A may be configured for WDM including DWDM. DWDM multiplexed signals may enable the fiber 106 to carry multiple signals using a single optical fiber and can increase the overall data transmission capacity. The transmitters 112, 122, 132, 142 may generate signals or channels at different wavelengths and the receivers 114, 124, 134, and 144 may be configured to receive signals or channels at different wavelengths. As illustrated, the network 100 includes one or more multiplexers (MUX) and/or de-multiplexers (DE-MUX) 150 and 160 that may be implemented as arrayed waveguide gratings ("AWG") (hereinafter "AWG 150" and "AWG 160") that are configured to multiplex and de-multiplex optical signals exchanged through the fiber 106. The optoelectronic modules 110, 120 are optically coupled to the AWG 150 and optoelectronic modules 130, 140 are optically coupled to the AWG 160. In other configurations, any suitable multiplexer and/or de-multiplexer may be implemented in the network 100 instead of the AWGs 150 and 160.

The AWG 150 and AWG 160 AWG may be configured to multiplex/de-multiplex a large number of wavelengths into a single optical fiber, such as the fiber 106. In some configurations, each channel in the network 100 may use light of a slightly different wavelength, and the light from a large number of these channels can be carried by a single optical fiber, such as the fiber 106, with negligible crosstalk between the channels. The AWGs 150 and 160 may be used to multiplex channels of several wavelengths onto a single optical fiber, such as the fiber 106, at the transmission end and may also be used as de-multiplexers to retrieve individual channels of different wavelengths at the receiving end of the network 100, and/or vice versa.

In operation, the optoelectronic modules 110, 120, 130, 140 may receive optical signals at corresponding receivers 114, 124, 134, 144. The receivers 114, 124, 134, 144 may transform the optical signals into electrical signals. The optoelectronic modules 110, 120, 130, 140 may also receive electrical signals for transmission as optical signals. Specifically, the optoelectronic modules 110, 120, 130, 140 may receive electrical signals from a host device and drive the corresponding transmitters 112, 122, 132, 142 to emit optical signals. The transmitters 112, 122, 132, 142 include a suitable light source, such as a semiconductor laser, that is driven by a drive signal causing the light source to emit optical signals representative of information.

Optical signals travelling from the first side 102 to the second side 104 may be generated by the transmitters 112, 122. The generated optical signals may be multiplexed together by the AWG 150 and transmitted over the fiber 106. The optical signals may travel over the fiber 106 to the AWG 160, which de-multiplexes the optical signals and directs the various wavelengths to the respective optoelectronic modules 130, 140. The respective optical signals may be received at respective receivers 134 and 144 of the optoelectronic modules 130, 140.

Optical signals travelling from the second side 104 to the first side 102 may be generated by the transmitters 132, 142. The generated optical signals may be multiplexed together by the AWG 160 and transmitted over the fiber 106. The optical signals may travel over the fiber 106 to the AWG 150, which de-multiplexes the optical signals and directs the various wavelengths to the respective optoelectronic modules 110 and 120. The respective optical signals may be received at respective receivers 114 and 124 of the optoelectronic modules 110 and 120.

Some of the optoelectronic modules in the network 100 may be wavelength-tunable optoelectronic modules. A wavelength-tunable optoelectronic module may include a tunable laser whose wavelength of operation can be altered in a controlled manner. In the configuration illustrated in FIG. 1A, the optoelectronic modules 130 and 140 on the second side 104 are wavelength-tunable optoelectronic modules. As illustrated, the optoelectronic modules 130, 140 may include wavelength tuners 138 and 148, respectively. The wavelength tuners 138 and 148 may include control circuitry, a wavelength locker, a thermoelectric cooler ("TEC"), and/or other features. The wavelength tuners 138 and 148 may be configured to adjust the wavelengths of the optical signals emitted by the transmitters 132, 142. For example, emission wavelengths of the transmitters 132, 142 may be adjusted by changing the operating temperature of the transmitters 132, 142, for example, via TEC's coupled to corresponding transmitters 132, 142. The control circuitry of the wavelength tuners 138 and 148 may operate the TEC's to control the temperature of the transmitters 132, 142 and thereby adjust the emitted wavelengths of optical signals.

In the configuration illustrated, the optoelectronic modules 110 and 120 on the first side 102 do not include wavelength tuners and may be fixed wavelength optoelectronic modules. In such configurations, the transmitters 132, 142 may be fixed wavelength transmitters. In other implementations of the network 100, either the first side 102 or the second side 104 may include wavelength-tunable optoelectronic modules or fixed wavelength optoelectronic modules, or a combination thereof. Furthermore, the network 100 may include any suitable number of wavelength-tunable optoelectronic modules or fixed wavelength optoelectronic modules.

The controllers 116, 126, 136, 146 may include high-speed data controllers with high-speed modulators such as high-speed laser drivers. The high-speed modulators may modulate the power output of a signal power source such as the corresponding transmitters 112, 122, 132 and 142 such that the high-speed data is converted to a form that can be transmitted across the fiber 106. The controllers 116, 126, 136, 146 may also include out-of-band data controllers. The out-of-band data controllers may further modulate the corresponding transmitters 112, 122, 132 and 142 using an out-of-band data modulator such that an out-of-band data stream is modulated onto the high-speed data signal to produce a double modulated signal that includes high-speed and out-of-band data to be exchanged via the fiber 106.

The out-of-band data may be modulated using a number of different modulation techniques including but not limited to amplitude modulation, frequency modulation, phase shift keying, binary phase shift keying, quadrature phase shift keying, and Manchester encoding. In some configurations, the out-of-band data may have a frequency range that is orders of magnitude less than the in-band data. In one example configuration, the out-of-band frequency may be 1.1 kilohertz (kHz), 1 kHz, or other suitable frequency.

The double modulated signal may be exchanged via the fiber and received at one of the receivers 114, 124, 134, and 144 of the optoelectronic modules 110, 120, 130, 140. The controllers 116, 126, 136, 146 may further each include an out-of-band detector that extracts the out-of-band data from the incoming double modulated signal. The controllers 116, 126, 136, 146 may also each include a high-speed data amplifier, e.g., a post amplifier, that extracts high-speed data from the incoming double modulated signal.

In some circumstances, the network 100 may implement automated tunable wavelength selection. In such configurations, the network 100 may be configured for WDM and may include fixed wavelength optoelectronic modules (such as the optoelectronic modules 110 and 120) on the first side 102 and wavelength-tunable optoelectronic modules (such as the optoelectronic modules 130 and 140) on the second side 104. The optoelectronic modules 110, 120, 130 and 140 of the network 100 may implement an optical signal feedback mechanism to automate tunable wavelength selection for the wavelength-tunable optoelectronic modules 130 and 140. In some configurations, the local fixed wavelength optoelectronic modules 110 and 120 on the first side 102 may use out-of-band signals to participate in automated tunable wavelength selection with the remote wavelength-tunable optoelectronic modules 130 and 140.

FIG. 1B is a representation of signals exchanged in the network 100 according to a method of automated tunable wavelength selection that may be implemented in the network 100 of FIG. 1A. FIG. 1B indicates whether signals are exchanged between the optoelectronic module 110 and the optoelectronic module 130 at corresponding transmitters 112, 132 and receivers 114, 134. A signal transmitted by the transmitters 112, 132 or received at the receivers 114, 134 during a given time period 1-6 is indicated by "on." When a signal is not transmitted by the transmitters 112, 132 or received at the receivers 114, 134 during a given time period 1-6, this is indicated by "off."

FIG. 1B also indicates whether a loss of signal indicator 152 is transmitted from the optoelectronic module 110 to be received at the optoelectronic module 130 and whether a loss of signal indicator 154 is transmitted from the optoelectronic module 130 to be received at the optoelectronic module 110. The loss of signal indicators 152 or 154 transmitted during a given time period 1-6 is indicated by "on" and the loss of signal indicators 152 or 154 not transmitted during a given time period 1-6 is indicated by "off." The loss of signal indicators 152 or 154 may be exchanged out-of-band via the fiber 106. The signals transmitted by the transmitters 112, 132 or received at the receivers 114, 134 may be exchanged in-band via the fiber 106.

During time period 1, the transmitters 112 and 132 and the receivers 114 and 134 are not activated ("off"), the loss of signal indicator 152 ("on") is transmitted from the optoelectronic module 110 to the optoelectronic module 130, and the loss of signal indicator 154 ("on") is transmitted from the optoelectronic module 130 to the optoelectronic module 110. In some configurations, out-of-band signals exchanged between the optoelectronic modules 110, 130 may indicate to begin automated tunable wavelength selection or tuning. During time period 2, the transmitter 112 is activated ("on") and transmits an in-band optical signal towards the receiver 134 that receives the in-band optical signal ("on"). In response to receiving the in-band optical signal at the receiver 134 ("on"), the optoelectronic module 130 terminates transmission of the loss of signal indicator 154 ("off") to the optoelectronic module 130. The transmitter 132 and the receiver 114 continue to be deactivated ("off") and the optoelectronic module 110 continues to transmit the loss of signal indicator 152 to the optoelectronic module 130.

During time period 3, the transmitter 132 is activated ("on") and transmits an in-band optical signal on a first wavelength channel $\lambda 1$ to the optoelectronic module 110. However, the optical signal on the first wavelength channel $\lambda 1$ is not received at the receiver 114 ("off"). The optical signal on the first wavelength channel $\lambda 1$ may not be received at the receiver 114 because the first wavelength channel $\lambda 1$ is not a selected wavelength channel. For example, the configuration of the receiver 114 may be such that the optical signal on the first wavelength channel $\lambda 1$ is not registered by the receiver 114. In another example, the configuration of the AWG 150 and/or 160 may be such that the optical signal on the first wavelength channel $\lambda 1$ is not directed to the receiver 114. Accordingly, the loss of signal indicator 152 persists ("on") as the optoelectronic module 110 continues to transmit the loss of signal indicator 152 to the optoelectronic module 130. Meanwhile, the transmitter 112 ("on") continues to transmit optical signals to the receiver 134 ("on").

As the automated tunable wavelength selection continues, the transmitter 132 may be tuned to cycle through transmission of optical signals on a plurality of wavelength channels until the loss of signal indicator 152 from the optoelectronic module 110 terminates. Specifically, the transmitter 132 may be tuned by the wavelength tuner 138 of FIG. 1A. Additionally or alternatively, the transmitter 132 may be iteratively cycled to transmit optical signals on a plurality of wavelength channels to the optoelectronic module 110 until the loss of signal indicator 152 terminates.

During time period 4, the transmitter 132 ("on") transmits an in-band optical signal on a second wavelength channel $\lambda 2$ to the optoelectronic module 110. However, the optical signal on the second wavelength channel $\lambda 2$ is not received at the receiver 114 ("off"). The optical signal on the second wavelength channel $\lambda 2$ may not be received at the receiver 114 because the second wavelength channel $\lambda 2$ is not a selected wavelength channel. For example, the configuration of the receiver 114 may be such that the optical signal on the second wavelength channel $\lambda 2$ is not registered by the receiver 114. In another example, the configuration of the AWG 150 and/or 160 may be such that the optical signal on the second wavelength channel $\lambda 2$ is not directed to the receiver 114. Accordingly, the loss of signal indicator 152 persists ("on") as the optoelectronic module 110 continues to transmit the loss of signal indicator 152 to the optoelectronic module 130. Meanwhile, the transmitter 112 ("on") continues to transmit optical signals to the receiver 134 ("on"). During time period 5, the transmitter 132 ("on") transmits an in-band optical signal on a third wavelength channel $\lambda 3$ to the optoelectronic module 110. The optical signal on the third wavelength channel $\lambda 3$ is received at the receiver 114 ("on"). Accordingly, the loss of signal indicator 152 terminates ("off") as the optoelectronic module 110 ceases to transmit the loss of signal indicator 152 to the optoelectronic module 130. The optical signal on the third wavelength channel $\lambda 3$ may be received at the receiver 114 because the third wavelength channel $\lambda 3$ is a selected wavelength channel. For example, the configuration of the receiver 114 may be such that the optical signal on the third wavelength channel $\lambda 3$ is registered by the receiver 114. In another example, the configuration of the AWG 150 and/or 160 may be such that the optical signal on the third wavelength channel $\lambda 3$ is directed to the receiver 114. Meanwhile, the transmitter 112 ("on") continues to transmit optical signals to the receiver 134 ("on").

The optoelectronic module 110 may cease transmitting the loss of signal indicator 152 to indicate to the optoelectronic module 130 that a corresponding wavelength channel (e.g., the third wavelength channel in this example) is received at the optoelectronic module 110. Alternatively or additionally, the optoelectronic module 110 may transmit to the optoelectronic module 130 an out-of-band signal that is distinct from the loss of signal indicator 152 and that indicates that the corresponding wavelength channel is received at the optoelectronic module 110 (hereinafter "receipt of signal indicator"). In an example embodiment, the loss of signal indicator includes an out-of-band signal with a frequency of 1.1 kHz, whereas the receipt of signal indicator includes an out-of-band signal with a frequency of 1 kHz. The optoelectronic module 130 may cease tuning the transmitter 132 with the tuner 138 in response to cessation of the loss of signal indicator 152 and/or in response to receiving the receipt of signal indicator from the optoelectronic module 110.

During time period 6, the transmitter 132 ("on") may continue to transmit the optical signal on the selected wavelength channel of the third wavelength channel $\lambda 3$. The transmitter 132 ("on") may continue to transmit the optical signal on the selected wavelength channel in response to the loss of signal indicator 152 terminating ("off") while transmitting an optical signal on the selected wavelength channel during time period 5 and/or in response to receiving the receipt of signal indicator during time period 5. In some configurations, the automated tunable wavelength selection may terminate at the beginning of time period 6.

Although in the illustrated example the selected wavelength channel is attained after iteratively cycling through transmission of optical signals on three wavelength channels, in other circumstances the selected wavelength channel may be attained after cycling through transmission of optical signals on any suitable number of wavelength channels. For example, the selected wavelength channel may be attained on the first wavelength channel $\lambda 1$, the second wavelength channel $\lambda 2$, or any one of a plurality of wavelength channels $\lambda n$. In some configurations, the transmitter 112 may iteratively cycle through wavelength channels $\lambda i$ (for i=integers 1 to n) until the selected wavelength is attained and/or the loss of signal indicator 152 terminates ("off"). In some configurations, out-of-band signals exchanged between the optoelectronic modules 110, 130 may indicate to terminate automated tunable wavelength selection or tuning.

Figure 2A:
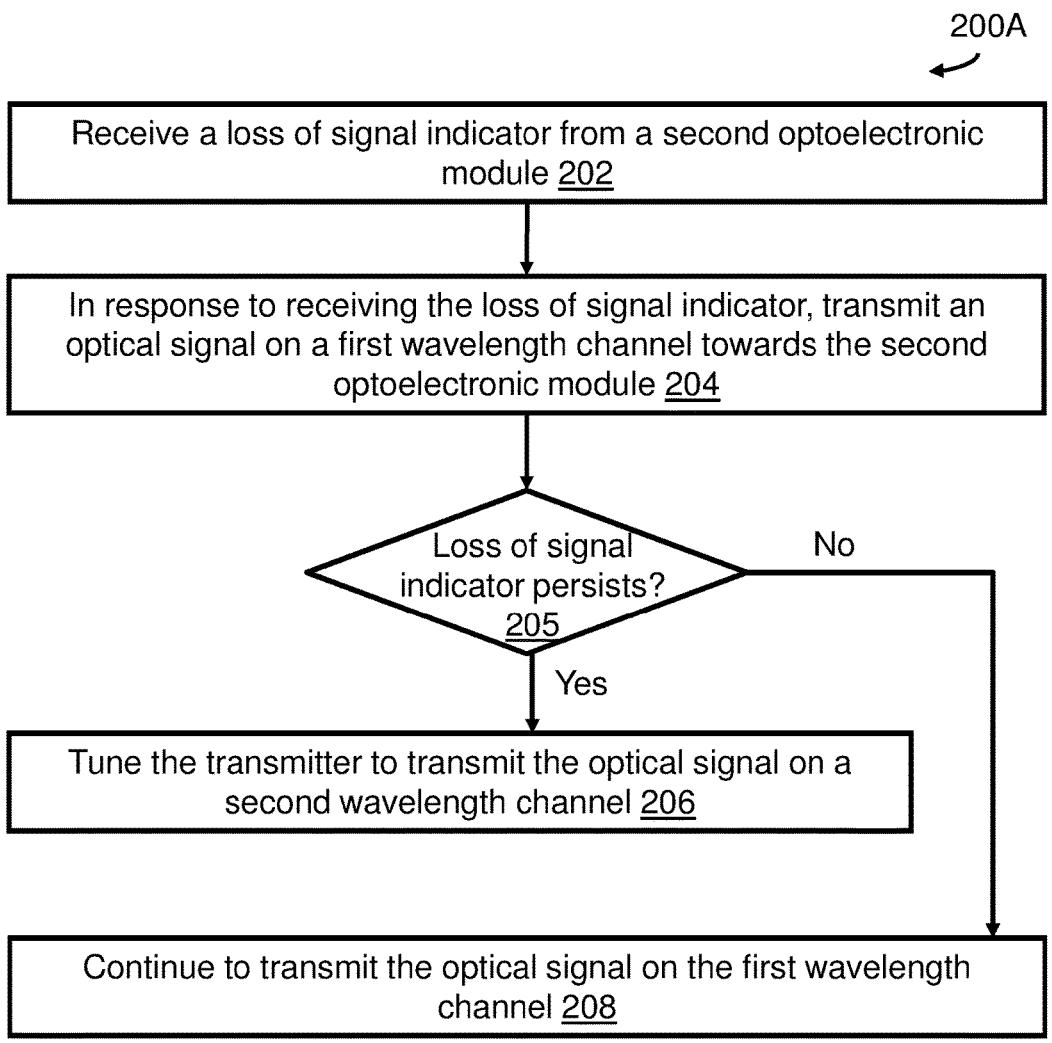
FIG. 2A is a flow chart of an example method.
Figure 2B:
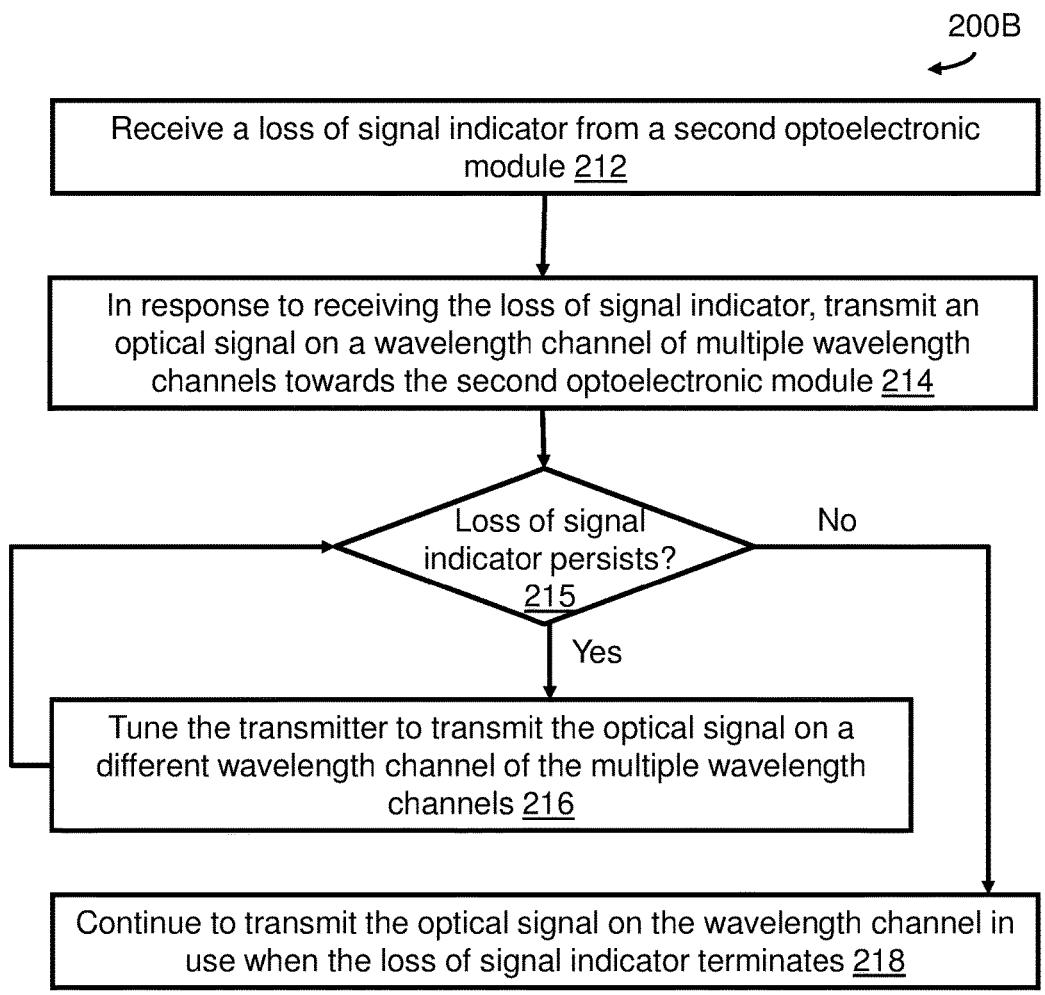
FIG. 2B is a flow chart of another example method.

FIG. 2A is a flow chart of an example method 200A and FIG. 2B is a flow chart of an example method 200B. In some aspects, the methods 200A and 200B may be implemented in networks such as the example network 100 of FIG. 1A. In some configurations, the methods 200A or 200B may be performed at a wavelength-tunable optoelectronic module, such as the optoelectronic modules 110 or 120.

Although illustrated as discrete blocks, various blocks may be divided into additional blocks, combined into fewer blocks, eliminated, and/or rearranged, depending on the desired implementation.

The method 200A of FIG. 2A may begin at block 202, in which a loss of signal indicator may be received at a first optoelectronic module. The loss of signal indicator may be received from a second optoelectronic module that is remote from the first optoelectronic module. In some configurations, the first optoelectronic module is a wavelength-tunable optoelectronic module and the second optoelectronic module is a fixed wavelength optoelectronic module.

At block 204, an optical signal may be transmitted on a first wavelength channel towards the second optoelectronic module in response to receiving the loss of signal indicator. The optical signal may be transmitted by a transmitter of the first optoelectronic module.

At block 205, whether the loss of signal indicator persists or terminates may be determined. If the loss of signal indicator persists ("yes"), the method 200A may proceed to block 206. If the loss of signal indicator terminates ("no"), the method 200A may proceed to block 208. At block 206, the transmitter may be tuned to transmit the optical signal on a second wavelength channel in response to the loss of signal indicator persisting. At block 208, the transmitter may continue to transmit the optical signal on the first wavelength channel in response to the loss of signal indicator terminating.

In some configurations of the method 200A, the transmitter may be tuned to cycle through transmission of optical signals on a plurality of wavelength channels until the loss of signal indicator terminates. The plurality of wavelength channels may include the second wavelength channel. The tuning of the transmitter may be performed in response to the loss of signal indicator persisting.

The tuning of the transmitter may be terminated in response to the loss of signal indicator terminating while transmitting an optical signal on a particular one of the plurality of wavelength channels and/or in response to receiving a receipt of signal indicator from the second optoelectronic module while the first optoelectronic module is transmitting on the particular one of the plurality of wavelength channels. The transmitter may continue to transmit the optical signal on the particular one of the plurality of wavelength channels.

In some configurations, the loss of signal indicator may be transmitted from a transmitter of the second optoelectronic module to the first optoelectronic module in response to not receiving an optical signal on a selected wavelength channel. The transmission of the loss of signal indicator may be terminated in response to receiving an optical signal on the selected wavelength channel from the first optoelectronic module.

The loss of signal indicator may be transmitted or received on an out-of-bound frequency. The loss of signal indicator may be transmitted or received on a frequency between 0 and 2 kHz, such as 1.1 kHz.

The method 200B may begin at block 212, in which a loss of signal indicator may be received at a first optoelectronic module. The loss of signal indicator may be received from a second optoelectronic module that is remote from the first optoelectronic module. In some configurations, the first optoelectronic module may be a wavelength-tunable optoelectronic module and the second optoelectronic module may be a fixed wavelength optoelectronic module.

At block 214, an optical signal may be transmitted on a wavelength channel of multiple wavelength channels towards the second optoelectronic module in response to receiving the loss of signal indicator. The optical signal may be transmitted by a transmitter of the first optoelectronic module.

At block 215, whether the loss of signal indicator persists or terminates may be determined. If the loss of signal indicator persists ("yes"), the method 200B may proceed to block 216. If the loss of signal indicator terminates ("no"), the method 200B may proceed to block 218. At block 216, the transmitter may be tuned to transmit the optical signal on a different wavelength channel of the multiple wavelength channels in response to the loss of signal indicator persisting.

The method 200B may include iteratively cycling through transmission of optical signals on a plurality of wavelength channels to the second optoelectronic module in response to receiving the loss of signal indicator. Iteratively cycling through transmission of optical signals on a plurality of wavelength channels may continue until the loss of signal indicator terminates. At block 218, the transmitter may transmit an optical signal on a particular one of the plurality of wavelength channels in response to the loss of signal indicator terminating while transmitting the optical signal on the particular one of the plurality of wavelength channels. The transmitter may continue to transmit the optical signal on the wavelength channel in use when the loss of signal indicator terminates.

In some configurations, iteratively cycling includes tuning the transmitter to transmit an optical signal on a subsequent wavelength channel of the plurality of wavelength channels in response to the loss of signal indicator persisting.

In some configurations, the loss of signal indicator may be transmitted from a transmitter of the second optoelectronic module to the first optoelectronic module in response to not receiving an optical signal on a selected wavelength channel. The transmission of the loss of signal indicator may be terminated in response to receiving an optical signal on the selected wavelength channel from the first optoelectronic module.

The loss of signal indicator may be transmitted or received on an out-of-bound frequency. The loss of signal indicator may be transmitted or received on a frequency between 0 and 2 kHz, such as 1.1 kHz.

Figure 3:
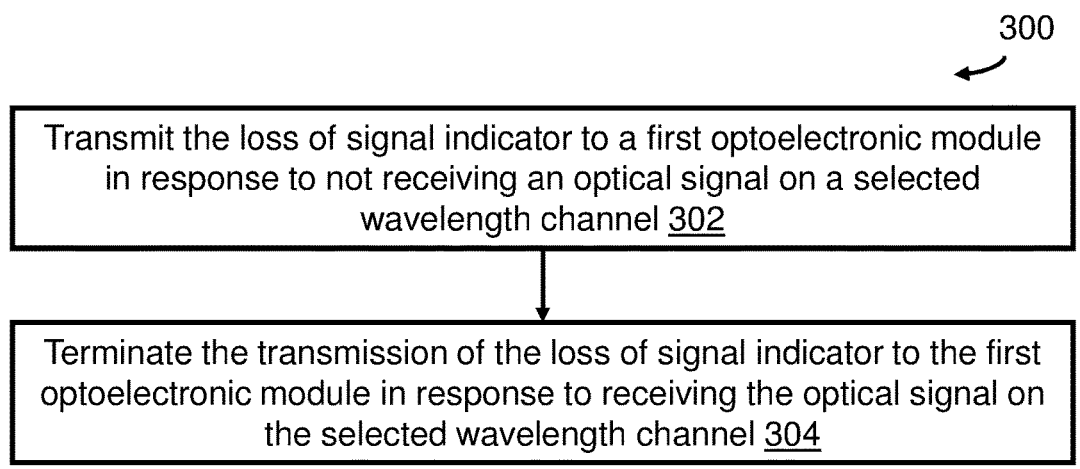
FIG. 3 is a flow chart of another example method.

FIG. 3 is a flow chart of an example method 300. In some aspects, the method 300 may be implemented in networks such as the example network 100 of FIG. 1A. In some configurations, the method 300 may be performed at a fixed wavelength optoelectronic module, such as the optoelectronic modules 130 or 140.

The method 300 may begin at block 302, in which a loss of signal indicator may be transmitted to a first optoelectronic module in response to not receiving an optical signal on a selected wavelength channel. The loss of signal indicator may transmitted from a transmitter of a second optoelectronic module. In some configurations, the first optoelectronic module may be a wavelength-tunable optoelectronic module and the second optoelectronic module may be a fixed wavelength optoelectronic module.

At block 304, the transmission of the loss of signal indicator to the first optoelectronic module may be terminated in response to receiving an optical signal on the selected wavelength channel from the first optoelectronic module.

The disclosed concepts may be suitable for 1 gigabit per second (G), 2G, 4G, 8G, 10G, 40G, 50G, 100G and higher bandwidth fiber optic links. Furthermore, the disclosed concepts may be implemented in optoelectronic devices of any form factor including, but not limited to, QSFP SFF, SFP, XFP, XPAK, X2, XENPAK, or CXP.

The disclosed concepts may facilitate implementing automated tunable laser wavelength selection for low-cost WDM applications. In some circumstances, the disclosed concepts may be implemented using colorless bidirectional optoelectronic transceivers. For example, in some configurations one or more of the optoelectronic modules 110, 120, 130, and 140 may be colorless bidirectional optoelectronic transceivers. In such configurations, the disclosed concepts may facilitate providing higher bandwidth communications while maintaining relatively low network deployment and maintenance costs.

In some configurations, the disclosed concepts may be implemented in cellular networks. For example, the disclosed concepts may be implemented in C-RAN architectures for mobile network infrastructure including LTE-A and 5G wireless applications. In some configurations, the disclosed concepts may be implemented in ultra-dense WDM applications enabled by coherent detection and tunable transceiver functionality. For example, the disclosed concepts may be implemented for WDM standards such as G.metro.

The terms used in the description and claims are not limited to the bibliographical meanings, but, are merely used to enable a clear and consistent understanding of the disclosure. It is to be understood that the singular forms of words such as "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method comprising:
receiving, at a receiver of a first optoelectronic module, a loss of signal indicator from a second optoelectronic module that is remote from the first optoelectronic module;
in response to receiving the loss of signal indicator, transmitting, by a transmitter of the first optoelectronic module, an optical signal on a first wavelength channel towards the second optoelectronic module; and
one of:
in response to the loss of signal indicator persisting, tuning the transmitter to transmit an optical signal on a second wavelength channel; or
in response to the loss of signal indicator terminating, continuing to transmit the optical signal on the first wavelength channel.

2. The method of claim 1, further comprising in response to the loss of signal indicator persisting, tuning the transmitter to cycle through transmission of optical signals on a plurality of wavelength channels that include the second wavelength channel until the loss of signal indicator terminates.

3. The method of claim 2, further comprising, in response to the loss of signal indicator terminating while transmitting an optical signal on a particular one of the plurality of wavelength channels:
terminating the tuning of the transmitter to cycle through transmission of the optical signals on the plurality of wavelength channels; and
continuing to transmit the optical signal on the particular one of the plurality of wavelength channels.

4. The method of claim 3, wherein the second optoelectronic module comprises a fixed wavelength optoelectronic module.

5. The method of claim 1, further comprising:
transmitting, at a transmitter of the second optoelectronic module, the loss of signal indicator to the first optoelectronic module in response to not receiving an optical signal on a selected wavelength channel; and
terminating, at the transmitter of the second optoelectronic module, the transmission of the loss of signal indicator to the first optoelectronic module in response to receiving an optical signal on the selected wavelength channel from the first optoelectronic module.

6. The method of claim 1, wherein the loss of signal indicator is received on an out-of-bound frequency.

7. The method of claim 1, wherein the loss of signal indicator is received on a frequency between 0 and 2 kilohertz.

8. A method comprising:
receiving, at a receiver of a first optoelectronic module, a loss of signal indicator from a second optoelectronic module that is remote from the first optoelectronic module;
in response to receiving the loss of signal indicator, iteratively cycling through transmission of optical signals on a plurality of wavelength channels to the second optoelectronic module until the loss of signal indicator terminates; and
in response to the loss of signal indicator terminating while transmitting an optical signal on a particular one of the plurality of wavelength channels, continuing to transmit the optical signal on the particular one of the plurality of wavelength channels.

9. The method of claim 8, wherein iteratively cycling comprises, in response to the loss of signal indicator persisting, tuning the transmitter to transmit an optical signal on a subsequent wavelength channel of the plurality of wavelength channels.

10. The method of claim 8, wherein the second optoelectronic module comprises a fixed wavelength optoelectronic module.

11. The method of claim 8, further comprising:
transmitting, at a transmitter of the second optoelectronic module, the loss of signal indicator to the first optoelectronic module in response to not receiving an optical signal on a selected wavelength channel; and
terminating, at the transmitter of the second optoelectronic module, the transmission of the loss of signal indicator to the first optoelectronic module in response to receiving the optical signal on the selected wavelength channel from the first optoelectronic module.

12. The method of claim 8, wherein the loss of signal indicator is received on an out-of-bound frequency.

13. The method of claim 8, wherein the loss of signal indicator is received on a frequency between 0 and 2 kilohertz.

14. An optoelectronic module comprising:
a first receiver configured to receive a loss of signal indicator from a second optoelectronic module;
a first transmitter configured to transmit an optical signal on a first wavelength channel towards the second optoelectronic module in response to the first receiver receiving the loss of signal indicator from the second optoelectronic module; and
a wavelength tuner configured to tune the first transmitter to transmit an optical signal on a second wavelength channel in response to the loss of signal indicator persisting or to maintain the first transmitter transmitting the optical signal on the first wavelength channel in response to the loss of signal indicator terminating.

15. The optoelectronic module of claim 14, wherein the wavelength tuner is further configured to tune the first transmitter to iteratively cycle through transmission of optical signals on a plurality of wavelength channels until the loss of signal indicator terminates.

16. The optoelectronic module of claim 14, wherein the wavelength tuner comprises at least one of a thermoelectric cooler, a wavelength locker, or control circuitry.

17. The optoelectronic module of claim 14, wherein the second optoelectronic module comprises a fixed wavelength optoelectronic module and a second transmitter of the second optoelectronic module comprises a fixed wavelength transmitter.

18. The optoelectronic module of claim 14, wherein the second optoelectronic module:

transmits the loss of signal indicator to the first transmitter in response to not receiving an optical signal on a selected wavelength channel; and terminates the transmission of the loss of signal indicator to the first transmitter in response to receiving the optical signal on the selected wavelength channel from the first optoelectronic module.

19. The optoelectronic module of claim 14, wherein the loss of signal indicator is received on an out-of-bound frequency.

20. The optoelectronic module of claim 14, wherein the loss of signal indicator is received on a frequency between 0 and 2 kilohertz.

* * * * *